J. B. HARRIS.
GARBAGE INCINERATOR.
APPLICATION FILED AUG. 23, 1913.

1,101,925.

Patented June 30, 1914.
3 SHEETS—SHEET 1.

Fig. 1

Witnesses
Robert M. Sulphes
U. J. Dowrick

Inventor
J. B. Harris

By Watson E. Coleman
Attorney

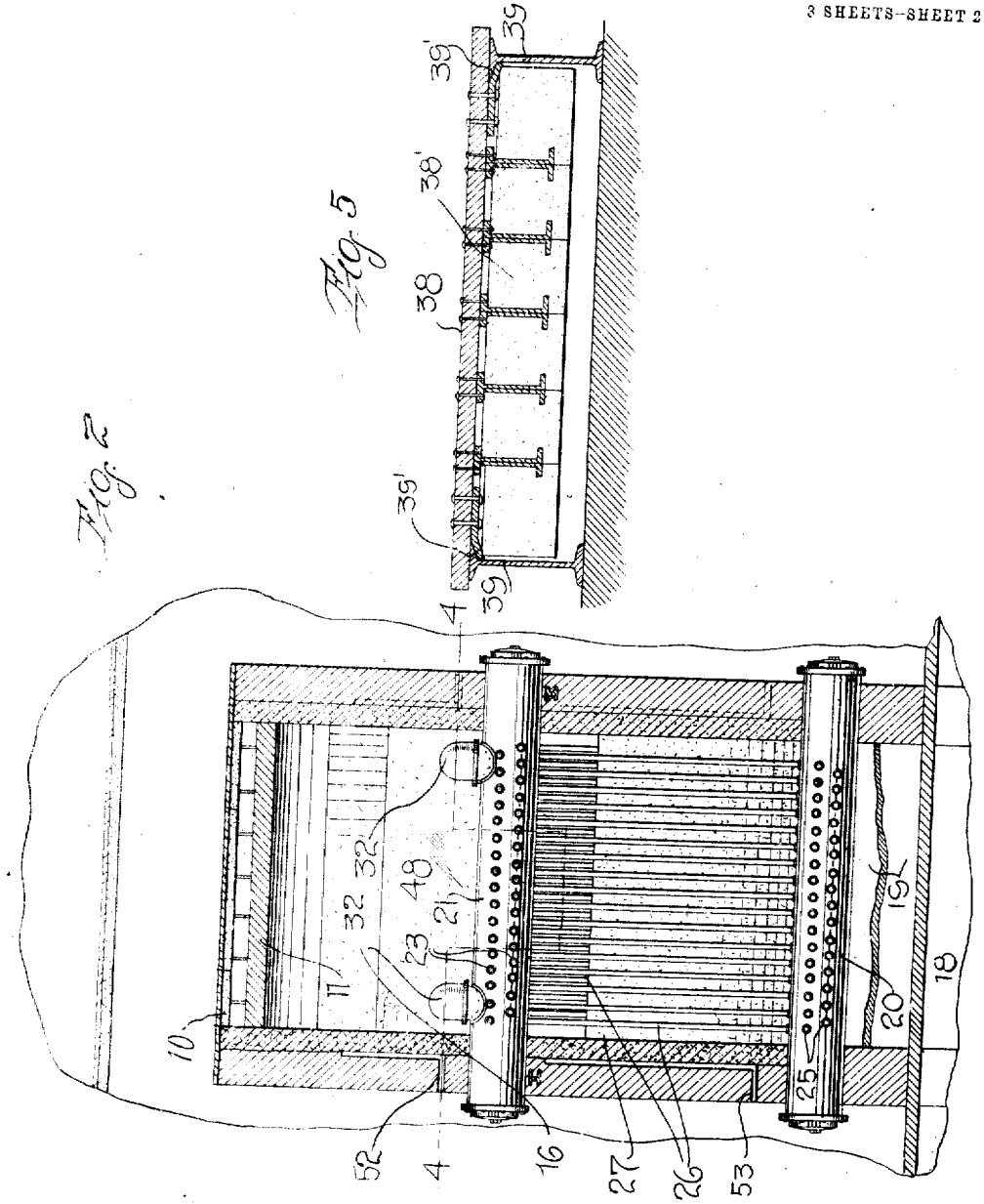

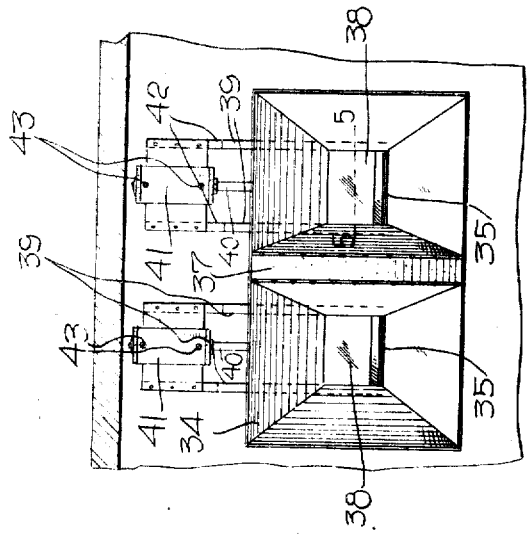

UNITED STATES PATENT OFFICE.

JOHN BROWN HARRIS, OF NASHVILLE, TENNESSEE.

GARBAGE-INCINERATOR.

1,101,925.  Specification of Letters Patent.  Patented June 30, 1914.

Application filed August 23, 1913. Serial No. 786,299.

*To all whom it may concern:*

Be it known that I, JOHN BROWN HARRIS, citizen of the United States, residing at Nashville, in the county of Davidson and State of Tennessee, have invented certain new and useful Improvements in Garbage-Incinerators, of which the following is a specification, reference being had to the accompanying drawings.

This invention relates to garbage incinerators such as that disclosed in Patent No. 1,006,379, issued to me October 17, 1911.

The present invention has for its primary object to provide an improved furnace or incinerator of the above character which is especially designed for the use of municipalities and large manufacturing concerns, in which means is embodied for insuring the complete combustion of the refuse matter and preventing the emission of obnoxious odors, and utilizing the heat of the products of combustion for the generation of steam to be employed for various purposes such as driving machinery and the production of electricity.

My invention has for another and very important object to provide improved means for charging the furnace with garbage and other refuse such as is collected from city streets.

Another and more specific object of the invention resides in the provision of a boiler including an upper series of drums and a lower feed water drum, said lower drum being connected to the upper drums by means of tubes, and the upper series of drums being connected to each other by horizontal tubes, one set of which constitutes an upper grate, and a superheater arranged exteriorly of the furnace proper and connected to the central drum of the upper series.

My invention further contemplates the provision of improved means for entirely consuming the sulfureted gases and converting the same into carbon dioxid and sulfur dioxid, in which form, the products of combustion are liberated to the atmosphere.

The invention further comprehends the provision of means embodied in the furnace walls to supply heated oxygenated air to the upper chamber of the furnace adjacent the arched dome thereof for admixture with the sulfureted hydrogen gas to insure the thorough combustion of the latter.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a vertical section of a garbage incinerator illustrating the preferred practical embodiment of the invention; Fig. 2 is a section taken on the line 2—2 of Fig. 1; Fig. 3 is a top plan view; Fig. 4 is a horizontal section taken on the line 4—4 of Fig. 2; Fig. 5 is a section taken on the line 5—5 of Fig. 3.

Referring in detail to the drawings, 5 designates the front wall of a furnace and 6 the rear wall thereof. These walls are lined with fire brick indicated at 7, said walls being strengthened by iron beams as indicated in the drawings. The fire brick lining of the front wall 5 is spaced from the wall proper to provide an air space 8. The furnace structure is preferably of rectangular form in plan and the outer faces of said walls are preferably covered by metal sheeting shown at 9. The side and end walls of the furnace are roofed with concrete or other plastic material 10 in which is embodied the arched dome wall 11 of the furnace. The furnace structure above referred to is inclosed within an outer building, (not shown) of three stories in height, and I have indicated on the accompanying drawings, the first, second and third floor levels. Immediately above the first and second floor levels, the front wall of the furnace is provided with suitable doors 12 and 13 respectively, whereby access may be had to the interior of the furnace for the purpose of cleaning the grates to be later referred to.

At the rear of the furnace structure, the same is provided with a flue 14, the upper end of which is connected as at 14' to the chimney stack 15. The intermediate wall 16 of fire brick between this flue and the interior of the furnace proper is provided adjacent its lower end with an outlet opening 17 for the products of combustion through which they enter the flue 14 and escape therefrom into the stack 15 from which they are finally discharged to the atmosphere. The flue 14 serves as a dust settling chamber, the dust collecting in the lower end of said flue from which it may be removed through a suitable clean out door provided in one of the flue walls. Centrally between the front wall 5 and the wall 16 of the furnace and upon a suitable foundation 18 of masonry the bridge wall 19 is built. This bridge wall is provided with a bed of asbestos having a cushion lined trough or seat for the lower feed water drum 20. A series of drums are arranged slightly above the second floor level, said drum series including a central drum 21 which is preferably of the same diameter as the lower drum 20 and the smaller side drums 22 which are arranged in and supported by the front wall 5 and the division wall 16 respectively of the furnace. The central drum 21 is connected to the side drums 22 by means of two series of tubes designated 23 and 24 respectively. The tubes in each series are arranged in pairs, said pairs of tubes being suitably spaced from each other for a purpose which will later appear. The upper side drums 22 are also connected to the lower central drum 20 by the two obliquely disposed series of tubes 25, said tubes being also arranged in pairs. A central vertical series of tubes 26 connect the upper and lower central drums 21 and 20. This central series of tubes is arranged in two sets or groups spaced from each other as clearly shown in Fig. 1. The rear or innermost set of tubes is incased in a baffle wall 27 which extends from the lower drum 20 to a point slightly below the second floor level of the furnace and in spaced relation to the upper central drum 21. The upper side drums 22 are mounted in saddle plates 22' which are movably supported upon the transverse bars or beams of the frame structure of the furnace. By mounting the side drums in this manner, the same may move inwardly or outwardly with respect to the central upper drum in the expansion or contraction of the connecting tubes 23 and 24. In the expansion of the oblique tubes 25, the lower feed drum 20 is moved in its cushioned asbestos bed on the bridge wall 19.

In the upper portion of the passage way or flue 14, the spaced drum heads 28 are arranged, said heads being connected by a plurality of tubes 29. These drum heads together with the longitudinally extending drum 30 constitute a superheater, said latter drum being connected to the heads 28 as shown at 31. Each of the drum heads 28 is also connected by a pipe 32 to the upper central drum 21 of the boiler. Pipes 33 are connected to the opposite end of the drum 30. One of these pipes is provided with a safety escape valve while the other of said pipes conducts the steam generated in the boiler to any desired point where the same is to be utilized.

The combustion chamber of the furnace is charged from the hopper 34 arranged in the third floor of the building, the roof and arched wall 11 of the furnace being provided with openings 35 lined with metal beams which are preferably faced with fire brick below the third floor level. The necks or spouts of the hopper chambers extend into the respective openings 35.

The hopper is centrally divided by a raised platform 37 into two chambers or compartments whereby the refuse matter is divided and fed through the openings 35 to equally distribute the same upon the series of grate tubes 23. A steel plate 38 is mounted for sliding movement in the longitudinal guides 39 and is movable over the upper end of the beams 36 which extend through the top of the furnace. To the under side of the plate 38, adjacent the opposite edges thereof, lugs 39' are secured for engagement with the guides 39 and fire brick 38' is hung from said plate to protect the same against the intense heat and obviate detempering of the same. It is understood that one of these sliding plates is provided for each chamber of the hopper. One end of the plate 38 is ground to a sharp chisel edge and the other end thereof is attached to the rod 40 of a double acting piston which operates in a cylinder 41. Each of the necks or spouts of the hopper is provided with steel frame extensions 42 and upon the same the bed plates of the cylinders 41 are suitably secured whereby movement of the cylinder with respect to the hopper by the pressure of steam acting upon the piston is obviated.

43 designates the steam pipes connected to opposite ends of each cylinder and adapted to alternately serve as inlet and exhaust pipes. These pipes are connected through the medium of a three-way valve 44 to the steam supply pipe 45, which extends to the boiler.

Between the bridge wall 19 of the furnace and the front wall 5 thereof, immediately below the door 12, a grate 46 is arranged. This grate preferably consists of two pivotally mounted swinging sections whereby its contents may be readily dumped in the manner to be later explained. In the front wall of the furnace, above each lower door opening, there is embodied a series of steam disassociators indicated at 47. As these disassociators are fully shown and described in my prior Patent 880,380, granted to me February 25, 1908, their further detail description in the present specification is deemed unnecessary.

A baffle wall 48 is built upon the upper central drum 21 and extends above the same for its entire length, said baffle wall having its upper edge disposed above the opening in the front wall of the furnace which is normally closed by the door 13. This baffle wall 48 is reinforced by a longitudinal beam 49. 50 indicates two vertical pipe legs which are connected to the drum heads 28 of the superheater and have their lower ends horizontally extended through the exit openings 17 in the wall 16 and connected to the lower drum 20.

As thus far described, the operation of the incinerator is as follows: The boiler is filled with water until the large pipes 32 are entirely filled as will be shown by means of suitable gages. The grate 46 is now fed with suitable fuel such as wood, coal etc., through the lower series of doors 12 until the interior of the furnace is thoroughly heated. The carts containing the city waste, including garbage, trash of every kind, dead dogs, cats, rats, horses and other animals, drive up and approach and enter upon the top floor of the building. The cart is backed up until its body is disposed over the hopper and its contents are dumped into the same. Previous to the deposition of the refuse matter upon the upper grate, the gas and products of combustion arising from the fire bed on the lower grate passes upwardly through the tubular grate 23 and over the upper baffle wall 48. These products then travel downwardly between the rear horizontal oblique boiler tubes, thereby heating the same. A hose or pipe 57 is connected to each of the upper side boiler drums 22 having a common outlet from which a stream of hot water may be directed into the carts to thoroughly sterilize the same. These water outlet pipes also provide an exit means for air which is contained in the boiler tubes and drums when the same are supplied with water.

Assuming that the large hopper is full of garbage and other waste matter, and that the operator requires more fuel for the operation of the furnace, he turns the three-way cock 44 in the double steam line from the boiler to the piston cylinder 41 so that the steam is admitted to one end of said cylinder, communication between the pipe 43 at the other end of said cylinder and the atmosphere being open. The piston in said cylinder is thus actuated to withdraw the steel plate 38 until the bottom of the hopper is fully opened so that the matter contained therein will fall downwardly by gravity into the furnace and upon the upper series of boiler tubes 23, which it will thus be seen, serve the purpose of a preliminary drying grate. The reversal of the three-way valve opens the pipe 43 at the opposite end of the cylinder which now serves as the exhaust while steam is admitted to the other end of said cylinder, the pipe 43 connected thereto admitting live steam. Thus the movement of the piston in the cylinder is reversed and the steel cut off plate 38, driven back to its closed position, the sharp chisel edge of said plate cutting its way through the mass of matter which may be disposed in the neck or spout of the hopper chamber. The admitted charge of garbage and other refuse consisting of paper, card board, sticks, carpets, etc., lodging upon the series of boiler tubes 23 is thoroughly dried, and the lighter particles of matter are immediately ignited and consumed. The fire upon the lower grate 46 sends its flame and heat upward beneath the upper series of grate tubes 23 so that the bed of refuse on said tubes together with the burning light material causes the ignition of the other matter which is not of a highly inflammable nature. The bed of refuse rapidly disintegrates so that it is constantly falling down through the interspaces between the grate tubes 23 upon the lower grate 46, where it is finally burned into hard innocuous clinkers and ashes.

As before stated, the baffle wall 27 terminates at its upper end below the central boiler drum 21. At times, the upper series of grate tubes 23 are covered with a compact impervious mass of refuse so that the draft cannot permeate the same. It is therefore obliged to pass over the baffle wall 27 from the lower gate 46 and over the top of the upwardly extending wall 48 from the upper grate 23 arranged above the drum 21. Thus there will be no back draft downwardly through the furnace and through the fuel bed on the grate 46. The lighter gas known as sulfureted hydrogen or "stink gases" will be held in the top of the interior of the furnace and as the flames from paper and other lighter material leap upwardly from the grate 23 over the baffle wall 48, these gases are set into flame and burn into $CO_2$ and $SO_2$. While these gases are in the sulfureted state, they are held in the dome of the furnace and away from the heat outlet ports 17 by the heavier products of combustion such as carbon dioxid and are prevented from passing downwardly and out of the furnace as will smelling and obnoxious gases until they have been converted by the above stated reactions.

During the operation of the incinerator, the interior of the furnace is at all times maintained at a temperature of above 1800 degrees Fahrenheit and for this reason, the drums and tubes of the boiler inside of the furnace proper, must be kept absolutely full of water to prevent the oxidization of the metal which would follow if any space were left therein. Thus the following circulation is constantly going on during the operation of the plant. As the temperature increases on the lower grate 46, the water will gradually rise from the feed drum and in the front oblique tubes 25 and in the vertical tubes 26, and pass into the upper front drum 22 and the upper central drum 21 and from the front drum through the grate tubes 23 to the central drum and then through the rear series of tubes 24 to the rear drum 22, and down the rear obliquely disposed bank of tubes 25 to the feed water drum 20 whence it began its circulation. When the temperature rises above 212 degrees Fahrenheit or the boiling point, another distinct circulation occurs of the highly heated water. The same then passes from the upper central drum through the pipes 32 into the drum heads 28 of superheater and to the tubes of superheater and the water which was contained in the drum heads 28 of superheater, being of less temperature than that entering the drums 28 from the central boiler drum 21 will sink down the two water legs 50 and return to the feed water drum 20 of the boiler. This comparatively cool water enters the first circulation above described, but at all times the cooler water in the superheater drum head will sink down through the pipe legs 50 and give way to the steam liberating water which is entering the drums 28 from the central upper boiler drum 21.

In addition to the above, I have provided means for insuring the quick and perfect combustion of the sulfureted gases given off by the burning refuse matter. To this end, I supply the strata of sulfureted gas in the dome of the furnace with oxygenated air. This supply of air is admitted through a series of inlets 51 which open into the interior of the furnace in the front wall thereof immediately adjacent the end of the arched dome wall 11, said inlet ports communicating with the air space 8 in the upper portion of the front wall 5 of the furnace above the upper series of doors 13. A series of ports 52 are formed in each of the side walls and the front wall of the furnace and supply atmospheric air to the vertical passages 8 therein. These vertical passages communicate with the corresponding passage in the upper portion of the front wall 5 thereof. An additional series of ports 53 are formed in each of the side walls of the furnace and communicate with the passages 8 thereof, which terminate at their upper ends approximately at the second floor level. The atmospheric air is supplied from this intra-mural passage to the passage 8 in the lower portion of the front wall and issues into the interior of the furnace over the lower grate 23, as will be later described. Air intake openings 54 are also formed in the front wall of the furnace immediately above the lower series of doors 12 and communicate with the air passage 8.

55 designates a dead plate extending longitudinally in the front wall of the furnace at the lower edge of the openings which are closed by the doors 13 and said plate is provided upon its inner edge with lugs 56 which engage upon the outer front boiler drum 22 and serve to space the dead plate therefrom. Through the front wall 5 of the furnace around the drum 22, air inlet ports 58 are formed which communicate with the air space 8 and discharge the atmospheric air entering said space through the ports 58, into the upper portion of the furnace immediately over the grate tubes 23. The air entering through the ports 52 and 54 is carried up through the passages 8 and finally admitted in a preheated condition into the space above the upper grate 23. This heated air which is highly impregnated with oxygen, greatly aids in the combustion of the matter upon the grate tubes 23. It is obvious that the upper grate could not be supplied with oxygenated air through the lower or bottom grate 46 irrespective of the amount of excess air which might arise through said lower grate. The oxygen which would be carried into the furnace through the lower grate would soon become combined with carbons and hydrocarbons before the oxygen could arise above the upper grate 23. Hence, it is highly essential that a circulation of oxygen air through the walls of the furnace be maintained primarily in order to prevent the expansion of the inner fire brick lining wall 7 from cracking the outer brick wall of the furnace which is not heated to such a high degree. In order for the air in the passages 8 to be constantly renewed so that it will not become static, there must be an outlet for the same and by providing this outlet immediately above the upper grate 23, a suction is created through the air space as the preheated air is withdrawn therefrom and a constant supply of fresh air is thus withdrawn into the space 8 between the furnace wall proper and its fire brick lining 7. As before stated, this fresh air enters the furnace immediately beneath the dome wall 11. The sulfureted hydrogen gas which is released in the burning of the garbage or other decaying matter is so much lighter than the atmospheric air that it rises to the very top of the furnace dome at the moment it is liberated and by the provision of the baffle wall 48, and the arrangement of the heat outlet ports at the very bottom of the rear combustion chamber, a gas trap is formed and the objectionable gases are held in the dome of the furnace. As all paper and other matter of a like character entering the furnace is quickly ignited upon the upper grate, the flames which leap over the top baffle wall 18 on the central drum 21 lick the arched dome wall 11 and owing to the constant admission of oxygenated air through the ports 51, will immediately ignite the gases held in the dome of the furnace and convert the same into sulfur dioxid, carbon dioxid and water.

As above stated, the matter upon the upper tubular grate 23 as it is consumed disintegrates and falls down between the grate tubes upon the obliquely disposed tubes 25. It slides down these latter tubes and falls between the same upon the lower dumping grate 46 where it is burned to ashes and clinkers. As hereinbefore referred to, the grate 46 consists of two pivotally mounted sections, and these sections are capable of independent operation by means of suitable levers to dump their contents which is dropped into steel hoppers arranged beneath the grate, said hoppers being arranged in a tunnel provided below the first floor line in which the ash cars are mounted upon suitable tracks. When the movement of the grate operating lever is reversed, the grate sections are brought to their closed positions as shown in Fig. 1. The hot ashes and clinkers in the ash hopper preheat the air which rises beneath the lower grate. When the ashes have become cool, a boy in the tunnel pushes the steel car along the track rails until it is disposed under the ash hopper. By manipulating another lever, the contents of the ash hopper may be dumped into the car which is now pushed with its load along the rails from under the furnace. The car is elevated to top floor by means of suitable mechanism, the contents thereof being discharged upon an inclined screen in constant motion through which the ashes pass by gravity into a suitable storage bin, the clinkers tailing over the screen by gravity down into a suitable bin or receptacle provided to receive the same. These clinkers are useful for ballasting road beds and various other purposes while the ash from the refuse matter is commercially valuable as a fertilizer. The rear wall 6 of the furnace is provided with a plurality of openings through which a steam hose may be inserted and the tubes of the superheater cleaned of accumulations of soot. These openings are of course, normally closed by suitable doors. Each of the boiler drums and the drums of the superheater is provided with suitable man holes whereby access may be had to the interior of the drums for the purpose of cleaning the boiler and superheater tubes. It is to be understood that the furnace may be built in double, triple or quadruple units up to any required capacity, generating from 100 to 1000 horse power per unit from the self contained water tube steam boilers and superheaters.

From the foregoing, it is thought that the construction and manner of operation of my improved incinerator will be clearly and fully understood. By the use of the same, garbage, waste paper, leaves, as well as the carcasses of dogs, cats, rats and other animals can be readily disposed of. By utilizing the refuse matter as a fuel, it will be obvious that the interior of the furnace is at all times maintained at a high temperature without the consumption of large quantities of wood, coal or other fuel. Thus I am enabled to produce steam for power, heating purposes, or the generation of electricity, thereby rendering the operation of the incinerator exceedingly economical and of obvious advantage to municipalities, large manufacturing concerns and the like.

While I have in the foregoing, described a particular construction of the lower grate 46, and the manner in which the ashes are discharged from the furnace and disposed of, it is to be understood that the particular structural features of this portion of the incinerator may be greatly modified, and it will therefore be appreciated that a different grate construction may be substituted for that shown in the accompanying drawings.

It is further to be understood that my invention is susceptible of considerable modification in many other of its structural features and I therefore reserve the right to resort to all such legitimate changes as may be fairly embodied in the spirit and scope of the invention, as claimed.

Having thus described the invention, what is claimed is:

1. A garbage incinerator comprising a vertically disposed furnace, upper and lower grates arranged therein, a boiler arranged in the furnace including a lower feed drum and an upper drum, a baffle wall built upon the lower feed drum and having its upper edge spaced from said upper drum, and an additional baffle wall built upon the upper drum and extending above said upper grate.

2. A garbage incinerator comprising a vertical furnace, a lower grate arranged therein, a boiler arranged in the furnace including a lower feed drum, an upper series of spaced drums, tubes connecting the upper drums to the feed drum, a series of horizontal tubes connecting adjacent upper drums and constituting an upper grate, and means for feeding the refuse matter to said upper grate.

3. A garbage incinerator comprising a vertical furnace, upper and lower grates arranged in said furnace, a boiler in the furnace including a lower feed drum, an upper drum, a series of tubes connecting said drums, a baffle wall incasing said tubes and having its upper edge disposed in spaced relation to said upper drum, and means for feeding the refuse matter to said upper grate.

4. A garbage incinerator comprising a vertical furnace, upper and lower grates arranged in said furnace, a boiler arranged in the furnace including a lower feed drum, an upper drum, a series of tubes connecting said drums, a baffle wall extending upwardly from the feed drum and incasing said tubes, the upper edge of said wall terminating in spaced relation to the upper drum, an additional series of exposed tubes connecting said drums, and means for feeding the refuse matter to the upper grate.

5. A garbage incinerator comprising a vertical furnace, upper and lower grates arranged in said furnace, a boiler arranged in the furnace including a lower feed drum, upper series of drums, a vertical series of tubes connecting the central drum of said upper series with the feed drum, obliquely disposed tubes connecting each of the other drums of said upper series with the feed drum, a series of horizontal tubes connecting one of said latter drums with the central upper drum, said horizontal tubes constituting an upper grate, and means for feeding the refuse matter to said upper grate.

6. A garbage incinerator comprising a vertical furnace, upper and lower grates arranged in said furnace, a boiler arranged in the furnace including a lower feed drum, an upper series of drums, a vertical series of tubes connecting the central drum of said upper series with the feed drum, obliquely disposed tubes connecting each of the other drums of said upper series with the feed drum, a series of horizontal tubes connecting one of said latter drums with the central upper drum, said horizontal tubes constituting an upper grate, a baffle wall partially incasing the vertical tubes connecting the central upper drum with the feed drum, and means for feeding the refuse material to said upper grate.

7. A garbage incinerator comprising a vertical furnace, a lower grate arranged therein, a boiler arranged in said furnace, including a lower feed drum, upper central and side drums, tubes connecting said upper drums to each other, said tubes constituting an upper grate, additional tubes connecting each of said upper drums to the feed water drum whereby a constantly circulating current of water through the drums is maintained, and means mounted upon the roof of the furnace to feed the refuse matter upon the upper grate tubes.

8. A garbage incinerator comprising a vertically disposed furnace, a lower grate arranged in said furnace, a boiler arranged in the furnace including a lower feed drum, upper central and side drums, a series of tubes connecting the latter drums and constituting an upper grate, a vertical series of tubes connecting the upper central drum and the feed drum, an additional obliquely disposed series of tubes connecting the feed drum to one of the upper side drums, said latter tubes extending between the lower grate and the upper series of grate tubes, and means for feeding the refuse matter upon the upper grate tubes.

9. A garbage incinerator comprising a vertical furnace, a lower grate arranged therein, a boiler arranged in said furnace including a lower feed drum, an upper series of drums, tubes connecting said latter drums with each other, additional tubes connecting each drum of the upper series with the feed water drum, a superheater, pipe connections between the superheater and the central drum of said upper series, additional pipe connections between the superheater and the feed water drum, and means for feeding the refuse matter upon the tubes connecting the drums of said upper series.

10. A garbage incinerator comprising a vertical furnace, a lower grate arranged therein, a boiler embodying a lower feed drum, upper central and side drums, tubes connecting said latter drums and constituting an upper grate, an obliquely disposed series of tubes connecting each of the said drums with the feed water drum, a central vertical series of tubes connecting the central upper drum with the feed drum, a baffle wall incasing said latter tubes but terminating at its upper edge in spaced relation to said upper central drum, an additional series of exposed tubes connecting said latter drums and the feed drum, a second baffle wall extending above said upper central drum, and means for feeding the refuse matter upon the boiler tubes connecting the upper series of drums.

11. A garbage incinerator comprising a vertical furnace provided with an outlet flue for the products of combustion and openings connecting said flue with the interior of the furnace, a grate arranged in said furnace, a boiler arranged in the furnace including a feed water drum and upper spaced drums, tubular connections between each of said drums and the feed water drum, a series of tubes connecting the upper drums to each other and constituting an upper grate, a superheater arranged in said flue, pipe connections between one of said upper drums and the superheater, additional pipe connections between the superheater and the feed water drum, a baffle wall extending above said latter upper drum, and means for feeding the refuse matter to the upper grate tubes.

12. A garbage incinerator comprising a vertical furnace provided with an outlet flue for the products of combustion and openings connecting said flue with the interior of the furnace, a grate arranged in said furnace, a boiler arranged in the furnace including a feed water drum and upper spaced drums, tubular connections between said drums and the feed water drum, a series of tubes connecting the upper drums to each other and constituting an upper grate, a superheater arranged in said flue, pipe connections between one of said upper drums and the superheater, additional pipe connections between the superheater and the feed water drum, a vertically disposed baffle wall extending between the feed drum and said latter upper drum but terminating in spaced relation to the upper drum, and means for feeding the refuse material upon the upper grate tubes.

13. A garbage incinerator comprising a vertical furnace, a central baffle wall therein dividing the same into front and rear combustion chambers, a lower grate arranged in the furnace below said baffle wall and at one side thereof, an upper grate arranged in the furnace on the same side of the wall as said lower grate and above said wall, and means for feeding the refuse matter upon said upper grate.

14. A garbage incinerator comprising a vertical furnace, a central baffle wall therein dividing the same into front and rear combustion chambers, a lower grate arranged in the furnace below said baffle wall and at one side thereof, an upper grate arranged in the furnace on the same side of the wall as said lower grate and above said wall, a second central vertically disposed baffle wall extending above said upper grate, and means for feeding the refuse matter upon said upper grate.

15. A garbage incinerator comprising a vertical furnace having a central baffle wall therein dividing the furnace into front and rear combustion chambers, a boiler arranged in said furnace including a lower feed drum, upper central and side drums, said central upper drum being disposed above and in spaced relation to said baffle wall, tubes connecting the upper series of drums to the feed water drum, a grate arranged in the furnace below said baffle wall and at one side of the feed drum, and means for supplying atmospheric air to the interior of the furnace immediately above the upper side drums.

16. A garbage incinerator comprising a vertical furnace having a central baffle wall therein dividing the furnace into front and rear combustion chambers, a boiler arranged in said furnace including a lower feed drum disposed immediately beneath said baffle wall and central and side upper drums, said central upper drum being disposed above and in spaced relation to the baffle wall, whereby communication is afforded between the front and rear combustion chambers below said upper drums, tubes connecting the upper series of drums to each other, additional tubes connecting each of said upper drums to the feed drum, a grate arranged in the furnace below and contiguous to said feed water drum, and means for supplying atmospheric air to the interior of the furnace immediately above the upper side drums.

17. A garbage incinerator comprising a vertical furnace, upper and lower grates arranged therein, means for supplying atmospheric air to the interior of the furnace at its dome, and means for feeding the refuse matter upon the upper grate.

18. A garbage incinerator comprising a vertical furnace, upper and lower grates arranged therein, the front wall of said furnace being provided with an air passage, the side walls of the furnace being provided with air intake openings in communication with said air passage to supply atmospheric air thereto, said front wall having a plurality of inlet openings therein communicating with the air space and opening into the furnace at its dome, and means for feeding the refuse matter upon the upper grate.

19. A garbage incinerator comprising a vertical furnace, a boiler arranged therein including a lower feed water drum and an upper series of drums, tubes connecting the upper series of drums to each other and additional tubes connecting each of said upper drums to the feed water drum, a grate arranged in the furnace below said feed water drum and at one side thereof, means for supplying atmospheric air to the interior of the furnace immediately above the upper side drums, and additional means for supplying atmospheric air to the interior of the furnace at its dome.

20. A garbage incinerator comprising a vertical furnace, a boiler arranged in the furnace including a lower feed drum, a yielding supporting bed therefor, upper central and side drums, tubes connecting the upper drums to each other, means for mounting the side upper drums for movement in the furnace walls with respect to the central upper drum, additional tubes connecting said side drums to the feed water drum, and a grate arranged in the furnace contiguous to said feed water drum.

21. A garbage incinerator comprising a vertical furnace, a lower grate therein, a boiler arranged in the furnace, including a lower feed drum, a yielding supporting bed for said drum, an upper series of spaced drums, tubes connecting the upper drums to the feed drum, a series of horizontal tubes connecting adjacent upper drums and constituting an upper grate, and means for feeding the refuse matter to said upper grate.

22. A garbage incinerator comprising a vertical furnace, a lower grate arranged therein, a boiler arranged in said furnace including a lower feed drum, a yieldable supporting bed therefor, upper central and side drums, tubes connecting said upper drums to each other, the tubes connecting one of the side drums to the central drum constituting an upper grate, movable saddles arranged in the walls of the furnace upon which the side drums are mounted, additional tubes connecting each of said upper drums to the feed water drum whereby a constantly circulating current of water through the drums is maintained, and means mounted upon the roof of the furnace to feed the refuse matter upon the upper grate.

In testimony whereof I hereunto affix my signature in the presence of two witnesses.

JOHN BROWN HARRIS.

Witnesses:
 LEWIS TILLMAN,
 G. N. TILLMAN.

It is hereby certified that in Letters Patent No. 1,101,925, granted June 30, 1914, upon the application of John Brown Harris, of Nashville, Tennessee, for an improvement in "Garbage-Incinerators," errors appear in the printed specification requiring correction as follows: Page 3, line 117, for the word "will" read *ill;* page 4, line 61, for the word "lower" read *upper;* and that the proper corrections have been made in the files and records of the office and are hereby made in the said Letters Patent.

Signed and sealed this 11th day of August, A. D., 1914.

[SEAL.]                                                             J. T. NEWTON,

*Acting Commissioner of Patents.*